United States Patent
Fickeisen et al.

(10) Patent No.: US 10,000,345 B2
(45) Date of Patent: Jun. 19, 2018

(54) CONVEYOR DEVICE WITH FLOW LIMITING DEVICE

(71) Applicant: JOSEPH VOEGELE AG, Ludwigshafen/Rhein (DE)

(72) Inventors: Steffen Fickeisen, Bad Duerkheim (DE); Laszlo Godard, Neustadt (DE); Martin Buschmann, Neustadt (DE)

(73) Assignee: JOSEPH VOEGELE AG (DE)

( * ) Notice: Subject to any disclaimer, the term of this patent is extended or adjusted under 35 U.S.C. 154(b) by 0 days. days.

(21) Appl. No.: 15/408,740

(22) Filed: Jan. 18, 2017

(65) Prior Publication Data
US 2017/0203928 A1    Jul. 20, 2017

(30) Foreign Application Priority Data
Jan. 18, 2016 (EP) .................................... 16151763

(51) Int. Cl.
B65G 47/16 (2006.01)
B65G 47/76 (2006.01)
E01C 19/12 (2006.01)
B65G 47/19 (2006.01)

(52) U.S. Cl.
CPC ............ *B65G 47/766* (2013.01); *E01C 19/12* (2013.01); *B65G 2201/045* (2013.01)

(58) Field of Classification Search
CPC .. B65G 2201/04; B65G 47/19; B65G 11/206; B65G 47/16; B65G 17/30
USPC ......... 198/633, 635, 463.4, 526, 534, 550.2, 198/836.1, 836.4
See application file for complete search history.

(56) References Cited

U.S. PATENT DOCUMENTS

| | | | | |
|---|---|---|---|---|
| 1,473,633 | A * | 11/1923 | Lea | G01F 13/003 198/534 |
| 1,982,824 | A | 12/1934 | Miltenberger | |
| 3,627,024 | A * | 12/1971 | Schumacher | B22C 5/08 164/270.1 |
| 3,707,222 | A * | 12/1972 | Hartley | B65G 65/00 198/525 |

(Continued)

FOREIGN PATENT DOCUMENTS

DE    9308170 U1    8/1993
GB    886191         1/1962
(Continued)

OTHER PUBLICATIONS

European Search Report dated Jul. 8, 2016, Application No. EP 16151763.6-1707, Applicant Joseph Voegele AG, 7 Pages.
(Continued)

*Primary Examiner* — James R Bidwell
(74) *Attorney, Agent, or Firm* — Brooks Kushman P.C.

(57) ABSTRACT

The disclosure relates to a conveyor device that comprises a conveyor belt with a conveying strand for conveying bulk material and a return strand. The conveying strand has a conveying surface on which a material flow is running whose feed rate is given by the product of a linear velocity of the conveying strand and a conveying cross-section of the material flow. The disclosure is characterized by a variable flow limiting device that is movable between a first position and a second position. The conveying cross-section downstream of the flow limiting device is smaller in the second position than in the first position.

17 Claims, 8 Drawing Sheets

(56) References Cited

U.S. PATENT DOCUMENTS

| | | | | |
|---|---|---|---|---|
| 4,108,301 A | * | 8/1978 | Trozzi | B65G 47/72 |
| | | | | 198/633 |
| 4,279,338 A | * | 7/1981 | Sekora | B65G 47/19 |
| | | | | 198/445 |
| 5,499,873 A | * | 3/1996 | Cummins | B01F 13/0013 |
| | | | | 366/218 |
| 2012/0318642 A1 | * | 12/2012 | Sundstrom | B65G 47/763 |
| | | | | 198/633 |

FOREIGN PATENT DOCUMENTS

| | | | | |
|---|---|---|---|---|
| JP | 53-61860 A | | 6/1978 | |
| JP | 53-113583 U | | 9/1978 | |
| JP | 53-36709 | | 10/1978 | |
| JP | 64-64911 | * | 3/1989 | B65G 17/30 |
| JP | 1-242307 A | | 9/1989 | |
| JP | 2010-138564 A | | 6/2010 | |
| JP | 2012-62734 A | | 3/2012 | |

OTHER PUBLICATIONS

Japanese Search Report Dated Feb. 9, 2018, Application No. 2017-001884, 13 Pages.
Japanese Office Action Dated Feb. 20, 2018, Application No. 2017-001884, 7 Pages.

* cited by examiner

CONVEYOR DEVICE WITH FLOW LIMITING DEVICE

CROSS-REFERENCE TO RELATED APPLICATIONS

This application claims foreign priority benefits under 35 U.S.C. § 119(a)-(d) to European patent application number EP 16 151 763.6, filed Jan. 18, 2016, which is incorporated by reference in its entirety.

TECHNICAL FIELD

The disclosure relates to conveyor devices, in particular devices that are used in connection with road construction works and therein convey for example asphalt, gravel, sand or other bulk materials. Such conveyor devices often have one or multiple conveyor belts on which the bulk material is transported. The conveyor belts can have a trough-like form in order to prevent bulk material from laterally falling off the conveyor belt.

BACKGROUND

The feed rate of conveyor belts, i.e., the amount (e.g., expressed by the mass or the volume) of bulk material conveyed per time unit, is controlled by adjusting the conveying speed. Such a control system has the disadvantage that, in particular in case of long conveyor belts, a large quantity, i.e., mass, of conveyed material has to be accelerated or slowed down for each adjustment of the feed rate. This has a negative effect on the energy efficiency and characteristics of wear of the components of the conveyor belt. In addition, the inclination of the conveyor belt has to be adapted to the changed conveying speed for conveyor belts in which the discharged material flow should hit a certain point so that the same point can be hit even after a change of the conveying speed.

Dosage sliders that regulate the size of a throughput opening of a conveyor tunnel through which a conveyor passes are known from the applicant's DE 93 08 170 U1. For this purpose, they are slid vertically from the top towards the conveyor in order to limit the quantity of material transported on such conveyor. Such a configuration can in particular be disadvantageous in case of conveyor belts with a trough-like shape as the geometry of said dosage slider has to be adapted to the trough shape of the conveyor belt in this case to ensure a feasible limitation of the material flow. The trough shape of the conveyor belt, however, can depend on the mass and the structure of the conveyed bulk material; an adapted form of the dosage slider, in turn, can only be suitable for one specific trough form. In particular in case of flat conveyor belts, a lateral spreading of the bulk material is facilitated by a dosage slider that is moved into the material flow from the top, whereby material may fall laterally off the conveyor belt. In addition, bulk material might roll to the side and also fall laterally off the conveyor belt in case of trough-shaped conveyor belts in an area ahead of a pulley in which the trough-shaped conveyor belt transitions into a flat form in order to ensure smooth passage of the conveyor belt around the pulley, i.e., during so-called detroughing of the conveyor belt.

SUMMARY

An object of the disclosure is to improve a conveyor device, in particular with regard to the previously mentioned disadvantages, in a constructive way that is as simple as possible.

A conveyor device according to the disclosure comprises a conveyor belt with a conveying strand for conveying bulk material and a return strand. The conveying strand has a conveying surface on which a material flow is running whose feed rate is given by the product of a linear velocity of the conveying strand and a conveying cross-section of the material flow. The conveyor device according to the disclosure is characterized by at least two variable flow limiting devices that are provided for variably adjusting the material flow running on one and the same conveying strand and that each are for this purpose movable between a first and a second position. The conveying cross-section downstream of the flow limiting devices is thereby smaller when at least one of the flow limiting devices is arranged in the second position than when both flow limiting devices are arranged in the first position. A conveying cross-section in this context can be an area, which is defined by an intersection of the material flow with a plane that is perpendicular to a conveying direction in which the bulk material is conveyed. A conveying cross-section can be regarded as smaller than a previous conveying cross-section if it has a smaller surface area, if it is narrower or if it is delimited in any other way in its expansion on the conveying strand perpendicular to the conveying direction. The movement direction of the flow limiting devices can be different.

The flow limiting devices can be arranged in a shifted way along the conveying direction or on the same level. In particular, they can engage with the material flow simultaneously or successively in the conveying direction if they are arranged in the second position.

The configuration according to the disclosure allows for a setting and/or modification of the feed rate also in case of a constant velocity of the conveyor belt. Also others of the abovementioned disadvantages of conventional conveyor devices can be prevented in this way, e.g., the flow limiting devices can be adapted better to trough-shaped conveyor belts due to their different movement direction.

The disclosure can be applied in conveyor belts that have an even conveying surface or that are bent in a trough-like way, for example around an axis that extends in the conveying direction.

It is possible that the flow limiting devices extend onto the surface of the conveying surface. In this way, even a flow of bulk material that is distributed flatly on the conveying surface can be delimited effectively. It is particularly advantageous if the flow limiting devices extend to the level of the conveying surface both in the first as well as in the second position.

It is conceivable in addition that the flow limiting devices are movable into the material flow from substantially lateral directions. Besides the change of the feed rate, it can also be ensured in this way that the material flow will maintain a sufficient distance to the lateral edge of the conveyor belt and that no bulk material will fall off the conveyor belt. An essentially lateral direction can be given for example by a direction vector of this substantially lateral direction, a direction vector of the conveying direction and a vector that is perpendicular to the conveying surface being linearly independent.

The flow limiting devices can for example be arranged symmetrically to a center of the conveying surface. In addition, it is possible that the two flow limiting devices can be moved into the material flow from different, substantially lateral directions. The flow limiting devices can for example be movable into the material flow from directions that are essentially opposite to one another.

Advantageously, the flow limiting devices are movable synchronously. This can for example ensure that the material flow will remain centered on the conveying surface. However, it is also possible that the flow limiting devices are movable asynchronously.

It is possible for the flow limiting devices to be operated rotatorily. In this process, the flow limiting devices can also be moved linearly, e.g., by one or multiple spindles or crank handles and/or one or multiple levers.

In addition, it is possible for the conveying cross-section to be modifiable by a rotation of the flow limiting devices. The rotation axes around which the flow limiting devices are rotatable can each be perpendicular to the conveying surface. Also rotation axes that are parallel to the conveying direction are possible. A rotation of the flow limiting device can occur by way of rotatory operation, for example by an electric or hydraulic motor, but also through linear operation, e.g., by a hydraulic or pneumatic cylinder.

The flow limiting devices can for example be pivotable, shiftable or foldable into the material flow.

It is advantageous for the conveying cross-section to vary along a conveying direction in a conveyor area, in which the conveying flow passes the flow limiting device. For example, the conveying cross-section can be larger at a start of said conveying area, which the conveying flow passes at an earlier time, than at an end of the conveyor area that the conveying flow passes at a later time. The change of the conveying cross-section can thereby either be continuous or occur in several steps.

It is advantageous for the flow limiting devices to be each continuously adjustable between the first and the second position. This way, the material flow can be adapted to the specific requirement flexibly and very accurately. The flow limiting devices can be manually adjustable.

In a variant, the flow limiting devices can be adjustable in dependence of the conveying speed or of another parameter. This way, for example an automated adaptation to different conditions, which can be detected automatically during operation of the conveyor device, is possible.

It is conceivable for the flow limiting devices to be adjustable by an electric, hydraulic or pneumatic actuator.

The conveyor device can for example be a road paver, a material transfer vehicle or an asphalt mixing plant or only a part of such devices.

The disclosure relates to a conveyor device of the type described above. In the following, advantageous embodiments will be explained in greater detail based on drawings.

BRIEF DESCRIPTION OF THE DRAWINGS

FIG. 1 is

DETAILED DESCRIPTION

Figure 1:
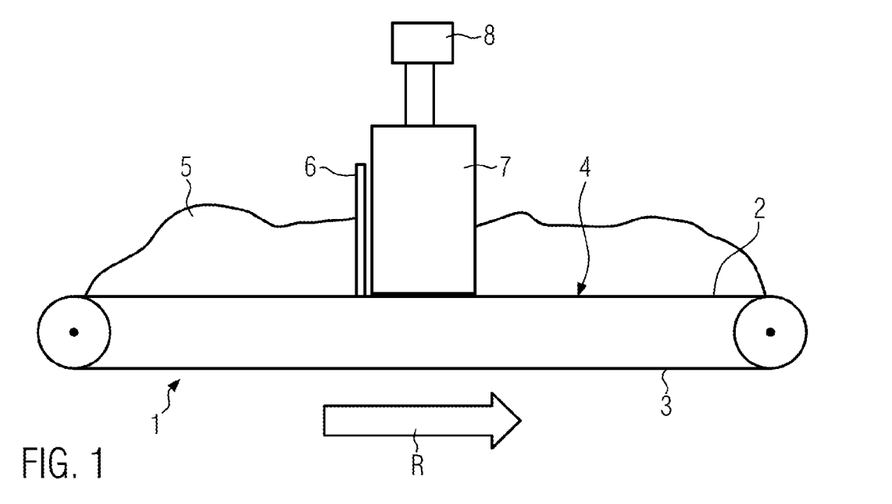
FIG. 1 shows a schematic side view of a conveyor belt of a conveyor device according to the disclosure with a flow limiting device according to the disclosure.

FIG. 1 shows a schematically displayed conveyor belt 1. It has a conveying strand 2 and a return strand 3. The conveying strand has a conveying surface 4 on which the material flow 5 is running. The material flow 5 is transported in a conveying direction R by the conveyor belt 1, more precisely by the conveying strand 2. A lens 6 is provided in the present embodiment. This lens, however, is not necessarily required. It can be provided to limit the material flow 5 to a specific width and/or to ensure a sufficient distance between the edge of the material flow and the lateral edge of the conveying strand 2. Downstream of the lens 6, flow limiting devices 7 are disposed of which, however, only one is visible due to the view. Such flow limiting devices, however, do not necessarily have to be arranged downstream of the lens 6. For example, they can also be provided upstream of the lens 6. An actuator 8 is displayed as well. It can be provided for actuating one or both of the flow limiting devices 7. According to the disclosure, the flow limiting devices 7 can each be moved between a first position and a second position as will be explained later.

Figure 2:
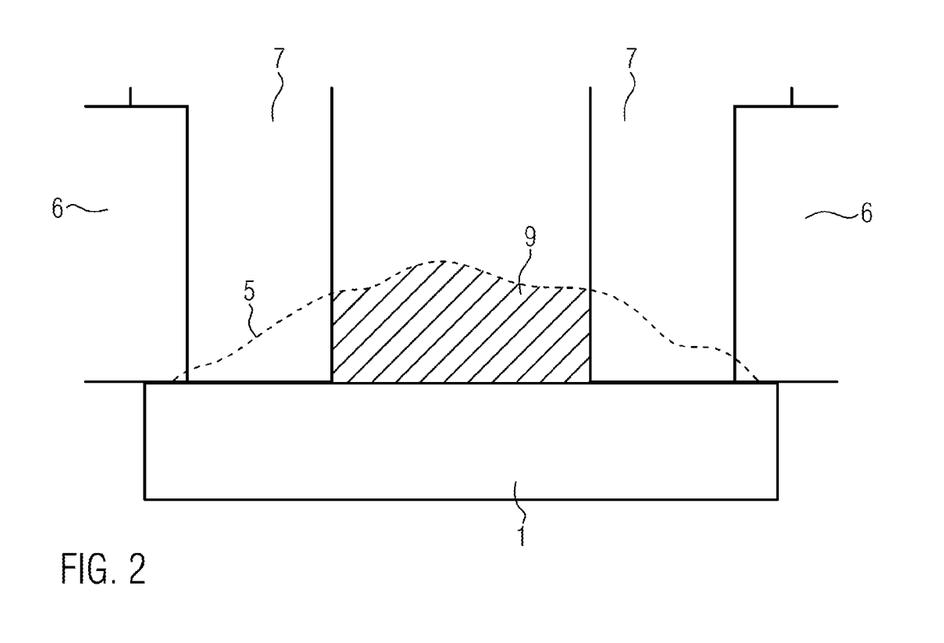
FIG. 2 shows a schematic front view in the conveying direction of the conveyor belt from FIG. 1.

FIG. 2 shows the conveyor belt 1, the material flow 5, the lens 6 as well as the flow limiting devices 7 in a front view with the conveying direction R as a viewing direction. A cross-section of the material flow 5 upstream of the lens 6 is indicated by a dashed line. A conveying cross-section 9, which exists directly downstream of the flow limiting devices 7, is marked by a hatched area. Through the arrangement of the flow limiting devices 7, the conveying cross-section 9 immediately after the flow limiting devices 7 can be influenced. If the flow limiting devices 7 are arranged in a first position, the conveying cross-section 9 will be larger than in cases where the flow limiting devices 7 are disposed in a second position. In the present embodiment, two flow limiting devices 7 are provided on the same conveyor belt 1 to influence the material flow 5. However, a larger number of flow limiting devices 7 is possible, i.e., also more than two. The flow limiting devices 7 can be moved between the first and the second position by an actuator 8 each or by a joint actuator 8. This can occur directly or indirectly by an operator but also automatically and/or be controlled in dependence of other parameters. The actuator 8 can be an electric, hydraulic or pneumatic actuator, e.g., an electric linear adjustment device.

Figure 3A:
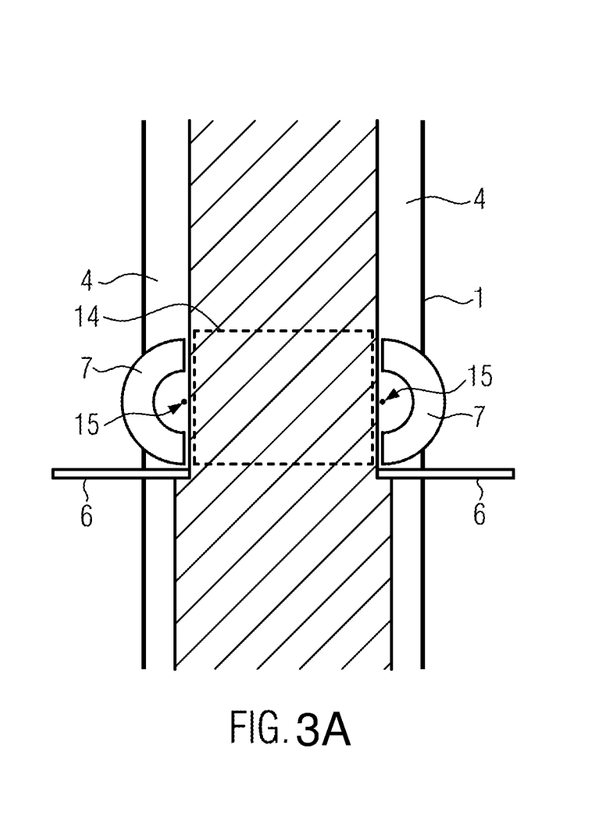
FIGS. 3A and 3B show a schematic plan view from above of the components shown in FIGS. 1 and 2 according to a first embodiment.
Figure 3B:
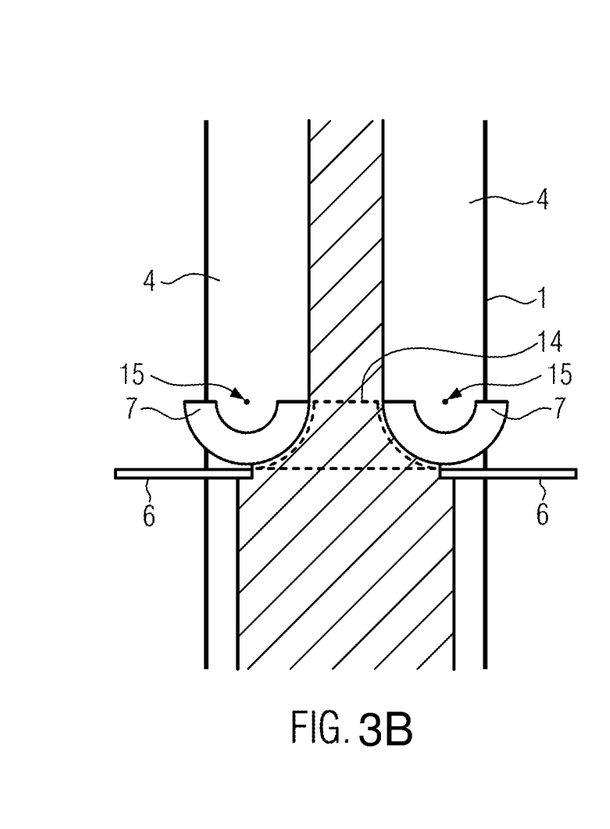

In the schematic plan views from FIGS. 3A and 3B, the first and second positions of the flow limiting devices 7 are visible more clearly. FIG. 3A displays the flow limiting devices 7 in the first position. FIG. 3B displays the flow limiting devices 7 in the second position. It can be seen clearly that the conveying cross-section 9 in FIG. 3B, which is disposed directly downstream of the flow limiting devices 7, is significantly narrower than in FIG. 3A. The positions of the flow limiting devices 7 displayed in FIGS. 3A and 3B shall be understood as exemplary end positions. Between said end positions, the flow limiting devices 7 can be adjustable continuously or in defined steps. In the embodiment shown in FIGS. 3A and 3B, flow limiting devices 7 are arranged symmetrically and opposite to one another in relation to the center of the conveyor belt 1. However, also any other appropriate arrangements are possible, which will be explained in greater detail later.

In the present embodiment, the flow limiting devices 7 are formed as semi-cylinders. This causes the conveying cross-section 9 to vary along the conveying direction R in a conveying area 14, in which the material flow 7 passes the flow limiting devices 7. This happens continuously due to the cylindrical form of the flow limiting device 7 in the present embodiment. However, it is also possible for the conveying cross-section 9 to vary in stages in this area 14.

Any other suitable forms are conceivable for the flow limiting devices 7. In addition, the flow limiting devices 7 are operated rotatorily in the present embodiment. In this process, they each rotate around a rotation axis 15 that is respectively perpendicular to the conveying surface 4. But also any other suitable movement types, e.g., translational movements, are possible.

Figure 4A:
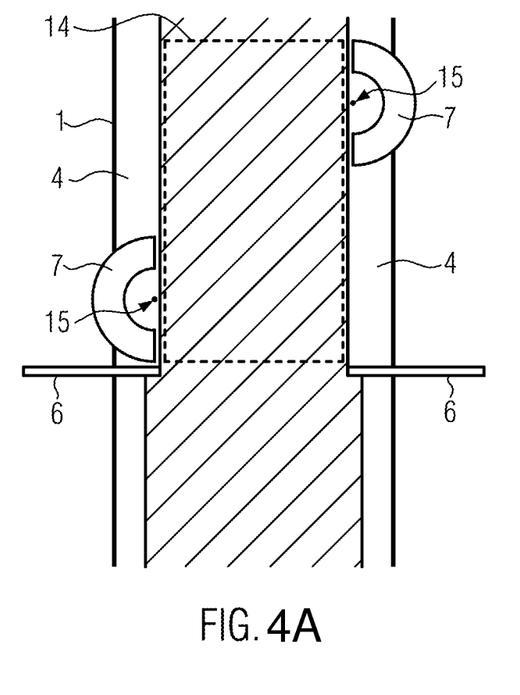
FIGS. 4A and 4B are each schematic plan views from above of the components shown in the previous Figures according to a second embodiment.
Figure 4B:
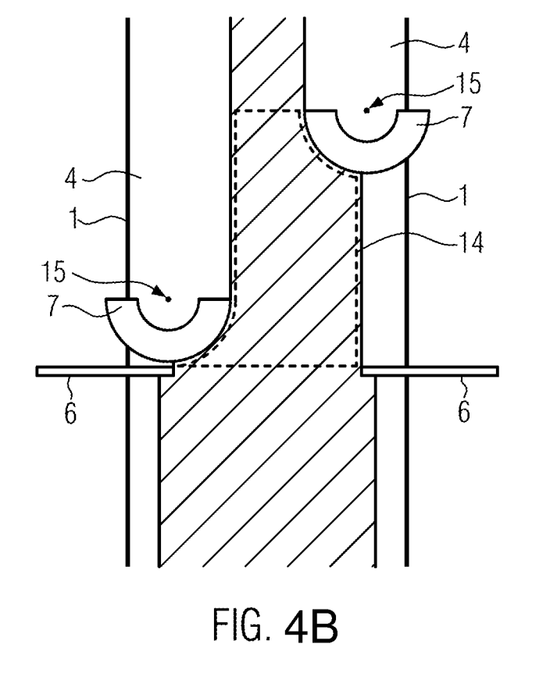

The embodiment displayed in FIGS. 4A and 4B is mostly equivalent to the embodiment displayed in FIGS. 3A and 3B. However, a difference consists in that the flow limiting devices 7 are offset along the conveying direction R. This delimits the conveying flow 5 initially at a first point from a first side and further downstream from a second side. This can be advantageous in certain configurations of the conveyor belt 1. For example, so-called trough conveyors are known in which the conveying strand 2 can have for example a nearly V-shaped cross-section, for example to prevent bulk material from escaping from the conveying surface 4 over the lateral edge. If such trough conveyors are used, it can be advantageous to incline the flow limiting devices 7 in accordance with the two flanks of the conveyor belt 1. It is possible that the flow limiting devices 7 would collide in case of an arrangement opposite to one another. In order to limit the conveying flow 5 from both sides nonetheless, for example the embodiment displayed in FIGS. 4A and 4B can be provided.

Figure 5A:
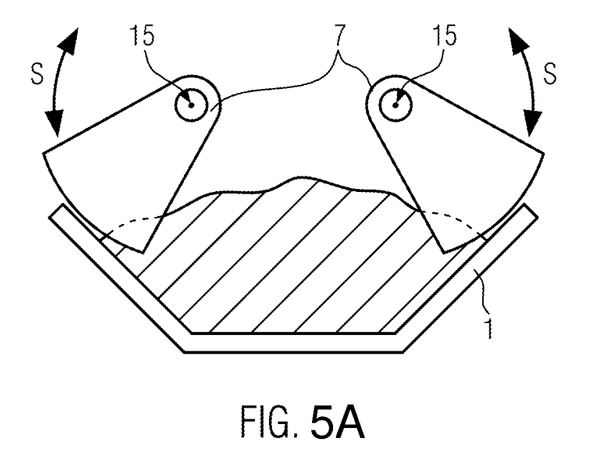
FIG. 5A shows a schematic front view in the conveying direction of a trough-shaped conveyor belt with flow limiting devices according to a further embodiment.
Figure 5B:
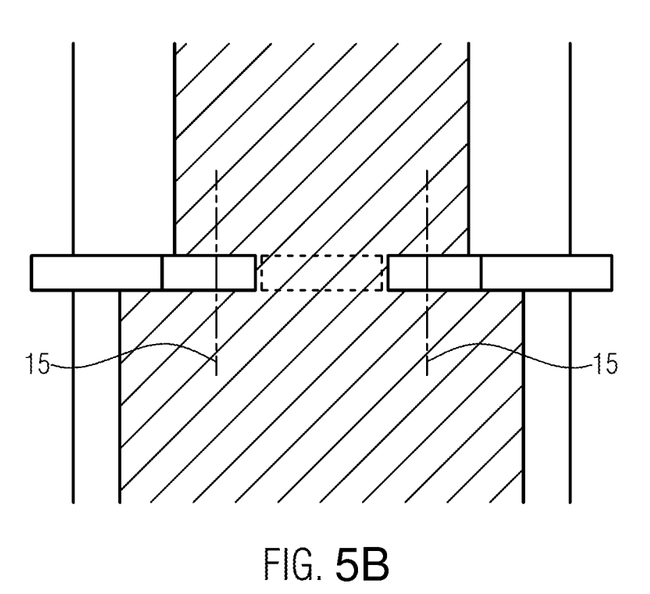
FIG. 5B shows a schematic plan view from above of the components shown in FIG. 5A.

A further embodiment of the flow limiting device 7 is illustrated in FIGS. 5A and 5B. This embodiment can in particular be advantageous if the conveyor belt 1 is formed in a trough-shaped way. In the displayed embodiment, the flow limiting devices 7 are pivoted around the rotation axis 15. The rotation axis 15 is parallel to the conveying direction R in this embodiment. The flow limiting devices 7 can thereby have a fan-like form. FIG. 5B shows the components of a plan view from above, wherein the position of the rotation axis 15 and the delimitation of the material flow 5 can be seen more clearly.

Figure 6A:
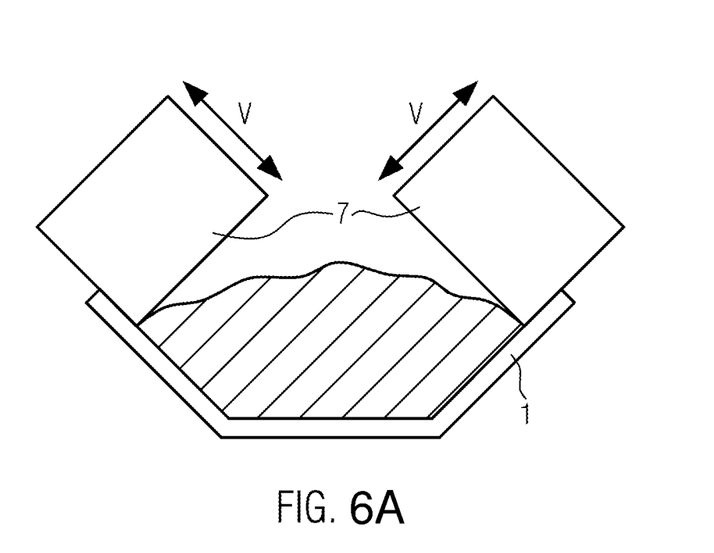
FIG. 6A shows a schematic front view in the conveying direction of a trough-shaped conveyor belt with flow limiting devices according to a further embodiment.
Figure 6B:
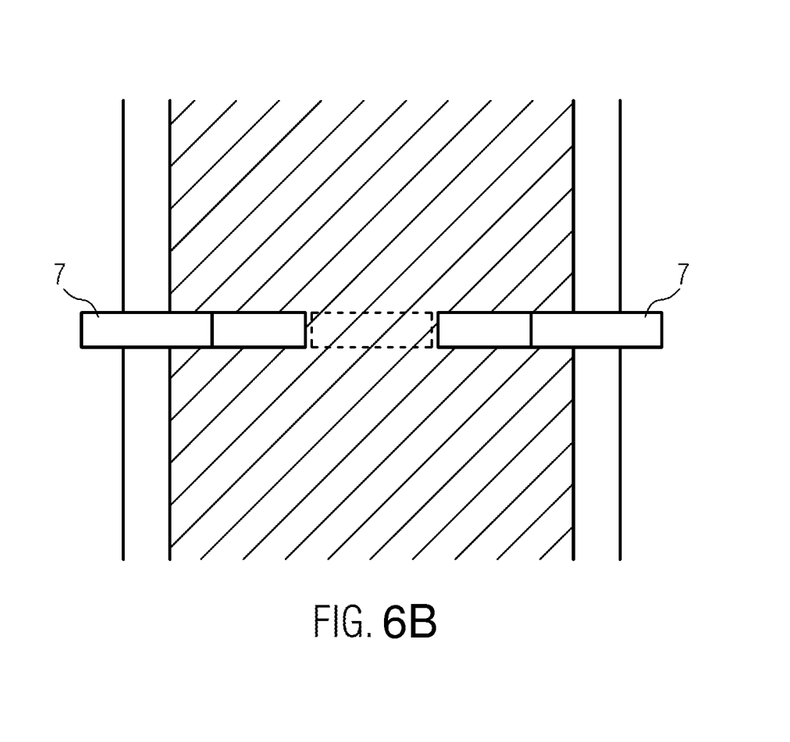
FIG. 6B is a schematic plan view from above of the components shown in FIG. 6A.

FIGS. 6A and 6B show a further embodiment of the flow limiting devices 7. This embodiment can also be advantageous if the conveyor belt 1 is formed in a trough-shaped way. The flow limiting devices 7 are shiftable in the shifting direction V in this case. The shifting directing V can be parallel to the conveying surface 4 and/or perpendicular to the conveying direction R. FIG. 6B shows the components in a schematic plan view from above. FIGS. 6A and 6B display the flow limiting devices in the first position so that the material flow 5 is not delimited there.

Figure 7A:
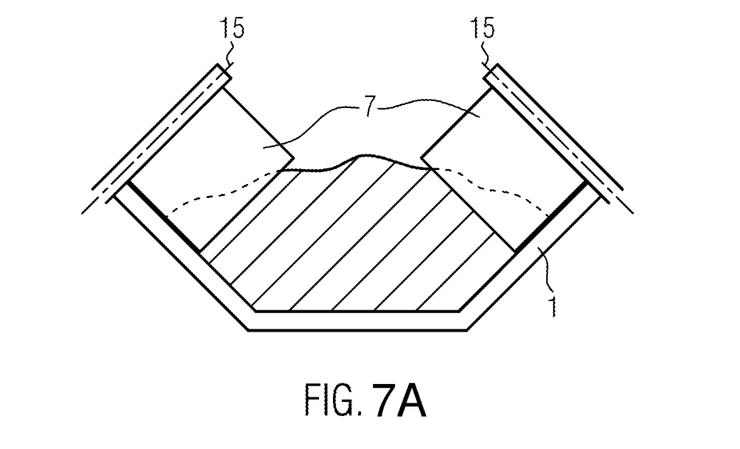
FIG. 7A is a schematic front view in the conveying direction of a trough-shaped conveyor belt with flow limiting devices according to a further embodiment.
Figure 7B:
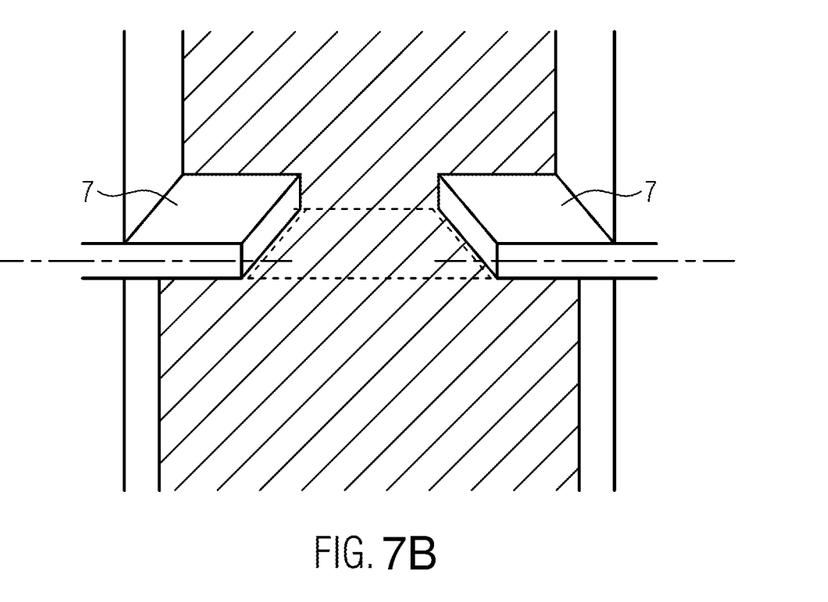
FIG. 7B is a schematic plan view from above of the components shown in FIG. 7A.

A further embodiment of the flow limiting devices 7 is displayed in FIG. 7A. This embodiment can also be advantageous in particular in case of a trough-shaped form of the conveyor belt 1. The flow limiting devices 7 are pivoted around the rotation axis 15 in this embodiment. In the present case, the rotation axis 15 is perpendicular to the conveying surface 4. In addition, the rotation axis 15 can be perpendicular to the conveying direction R. To illustrate the delimitation of the material flow 5, a plan view from above is indicated in FIG. 7B.

Figure 8:
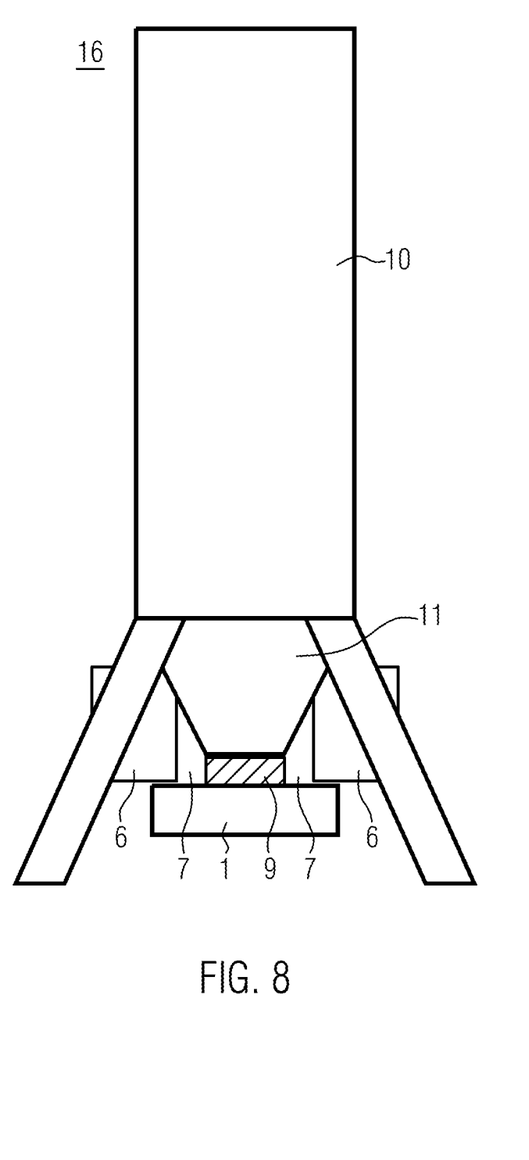
FIG. 8 shows a conveyor device according to a further embodiment.

A schematically displayed asphalt mixing plant 16 is shown as an example for a conveyor device according to the disclosure in FIG. 8. This plant can comprise for example a silo 10 out of whose material outlet 11 asphalt mixing material is applied onto the conveyor belt 1. Also in case of a constant conveying velocity of the conveyor belt, the feed volume of the conveyor belt 1 can be controlled by the configuration according to the disclosure with the flow limiting devices 7. Of course, the conveyor device according to the disclosure can also be a simple storage silo 10 that is provided independently of an asphalt mixing plant 16.

Figure 9:
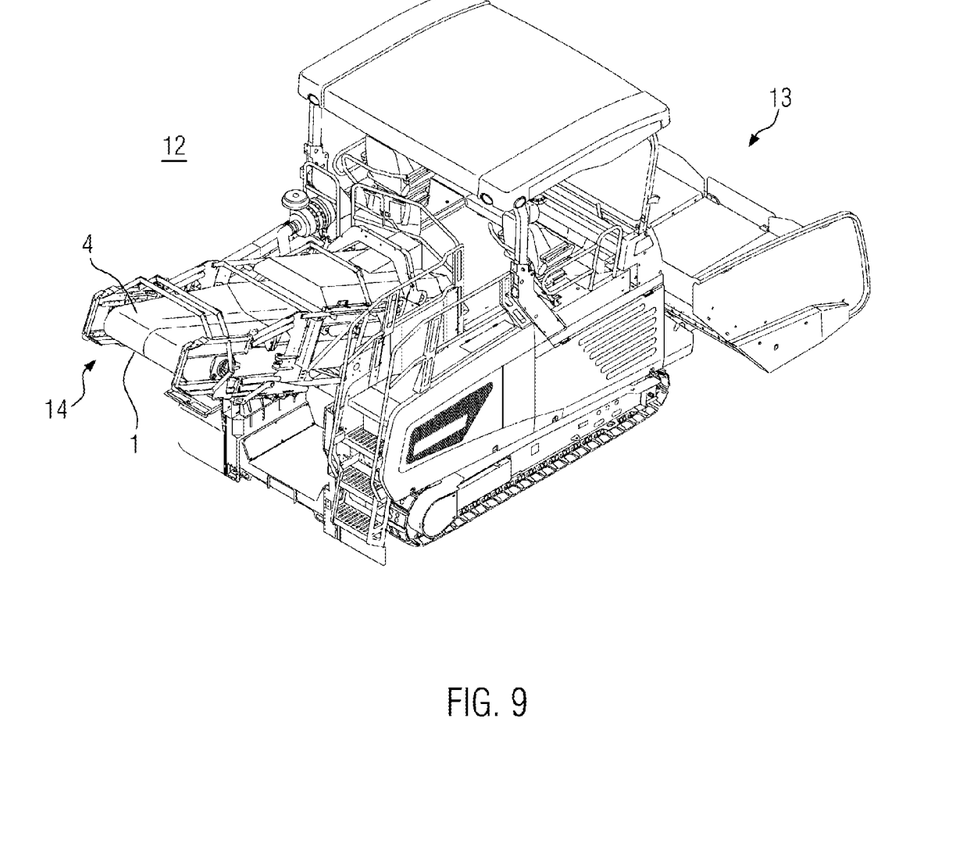
FIG. 9 shows a further conveyor device according to a further embodiment of the disclosure.

A material transfer vehicle 12 is shown as a further example for a conveyor device according to the disclosure in FIG. 9. This material transfer vehicle 12 has a material hopper 13 that can be filled with bulk material, in particular asphalt. The material is removed from this material hopper 13 by the conveyor belt 1 and transported to an ejector 14. The flow limiting devices 7 can be provided between the material hoppers 13 and the ejection unit 14.

The present disclosure can be designed as a fixed or as a mobile, e.g., self-propelled, conveyor device. Likewise, an application with any bulk materials is possible even if mainly asphalt is addressed in the embodiments described above. For example, sand, gravel or soil shall be mentioned as further examples.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A conveyor device comprising a conveyor belt with a conveying strand for conveying bulk material and a return strand, wherein the conveying strand has a conveying surface on which a material flow is able to run with a feed rate given by a product of a linear velocity of the conveying strand and a conveying cross-section of the material flow, wherein at least two variable flow limiting devices are provided for variably adjusting the material flow located on the same conveying strand, wherein each flow limiting device can be moved between a first position and a second position, wherein the conveying cross-section downstream of the flow limiting devices is smaller when at least one of the flow limiting devices is arranged in the second position than when both flow limiting devices are arranged in the first position, wherein each flow limiting device comprises a semi-cylinder, and wherein the flow limiting devices are configured to maintain a sufficient distance between the material flow and the lateral edge of the conveyor belt.

2. The conveyor device according to claim 1 wherein the flow limiting devices extend onto the conveying surface.

3. The conveyor device according to claim 1 wherein the flow limiting devices are movable into the material flow from substantially lateral directions.

4. The conveyor device according to claim 1 wherein the flow limiting devices are arranged symmetrically to a center of the conveying surface.

5. The conveyor device according to claim 1 wherein the flow limiting devices can be moved into the material flow from different directions.

6. The conveyor device according to claim 1 wherein the flow limiting devices can be moved into the material flow from substantially opposite directions.

7. The conveyor device according to claim 1 wherein the flow limiting devices are movable synchronously or asynchronously.

8. The conveyor device according to claim 1 wherein the flow limiting devices are rotatable.

9. The conveyor device according to claim 1 wherein the conveying cross-section can be adjusted through a rotation of the flow limiting devices.

10. The conveyor device according to claim 1 wherein the flow limiting devices can be pivoted, shifted or folded into the material flow.

11. The conveyor device according to claim 1 wherein the flow limiting devices are configured to adjust the conveying cross-section so that the conveying cross-section section varies along a conveying direction.

12. The conveyor device according to claim 11 wherein the flow limiting devices are configured to adjust the conveying cross-section so that the conveying cross-section becomes smaller in a conveying area in which the material flow passes the flow limiting devices.

13. The conveyor device according to claim 1 wherein the flow limiting devices are adjustable in dependence of conveying speed and other parameters.

14. The conveyor device according to claim 1 wherein the flow limiting devices are adjustable by means of an electric, hydraulic or pneumatic actuator.

15. The conveyor device according to claim 1 wherein the conveyor device is a road paver, a material transfer vehicle or an asphalt mixing plant.

16. The conveyor device according to claim 1 wherein the flow limiting devices prevent bulk material from falling off the conveyor belt.

17. A conveyor device comprising:

a conveyor belt with a conveying strand for conveying bulk material, wherein the conveying strand has a conveying surface for conveying a material flow with a feed rate given by a product of a linear velocity of the conveying strand and a conveying cross-section of the material flow; and at least two variable flow limiting devices for variably adjusting the material flow on the conveying strand, wherein each flow limiting device is movable between a first position and a second position, wherein the flow limiting devices are configured to adjust the material flow so that the conveying cross-section downstream of the flow limiting devices is smaller when at least one of the flow limiting devices is arranged in the second position than when both flow limiting devices are arranged in the first position, and wherein the flow limiting devices are rotatable and each flow limiting device comprises a semi-cylinder.

* * * * *